United States Patent [19]

Gaudel

[11] 4,104,529
[45] Aug. 1, 1978

[54] APPARATUS FOR SUCCESSIVELY POSITIONING A SERIES OF RADIOGRAPHIC FILM CASSETTES AT A FILM-EXPOSING STATION

[76] Inventor: Jacques Gaudel, 5 du Tertre St., Remiremont, France, 88200

[21] Appl. No.: 750,532

[22] Filed: Dec. 14, 1976

[51] Int. Cl.² ............................................. G11B 1/00
[52] U.S. Cl. .................................................. 250/470
[58] Field of Search ................ 250/468, 469, 470, 471

[56] References Cited

U.S. PATENT DOCUMENTS 2,999,159  9/1961  Curry ................................... 250/470

Primary Examiner—Davis L. Willis

[57] ABSTRACT

An apparatus for successively positioning a series of radiographic film cassettes at a film-exposing station, comprising an endless chain, the links of which consisting of thin boxes hinged to one another and each adapted to receive a radiographic film cassette. The chain is trained on two rotatable drums of polygonal cross-section, the faces of which have a width equal to the length of a link. The distance between the drum axes is equal to the length of a link or to a multiple of said length. The pivotal axes are disposed parallel to a patient-examining plane and at a distance as small as possible from said plane without preventing rotation of the drums.

9 Claims, 9 Drawing Figures

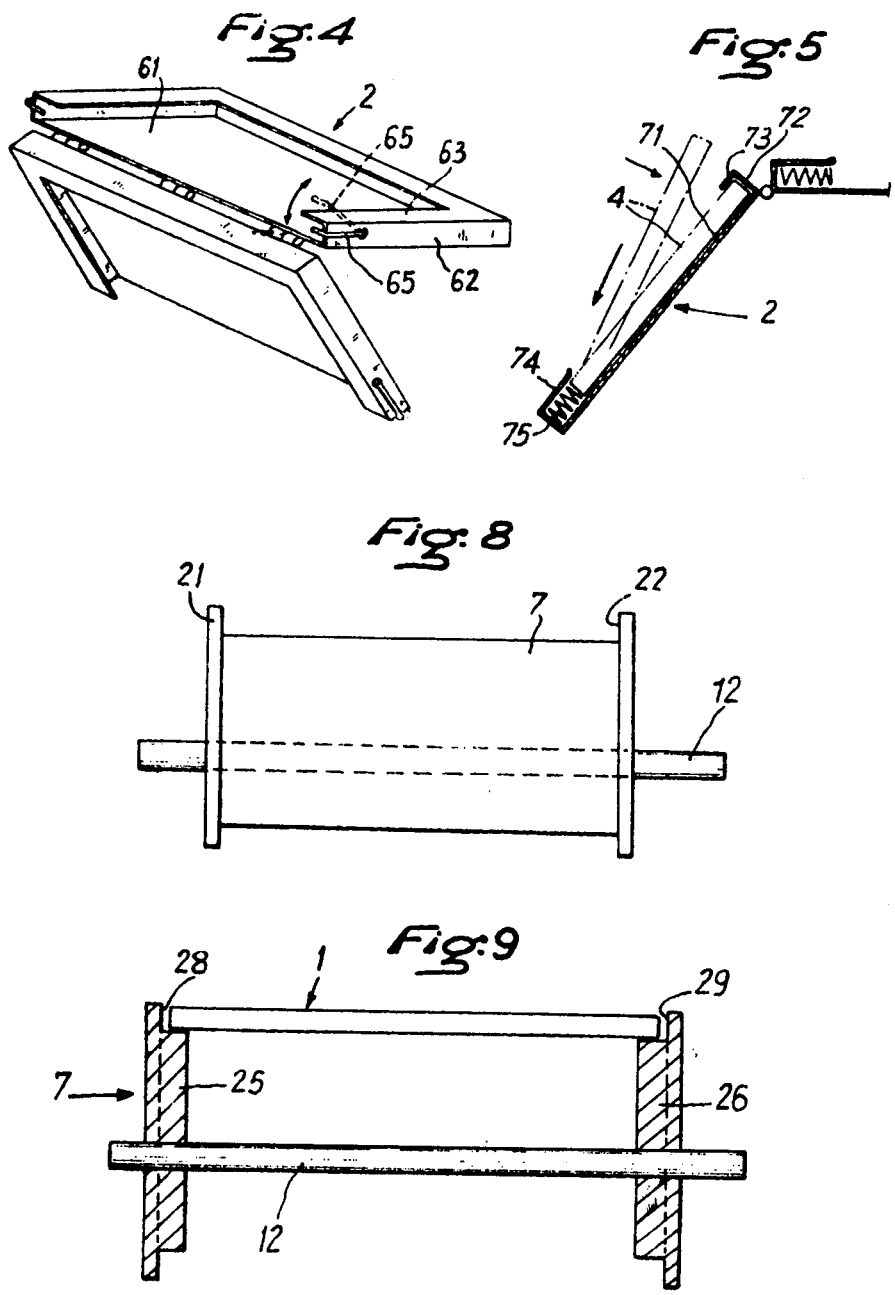

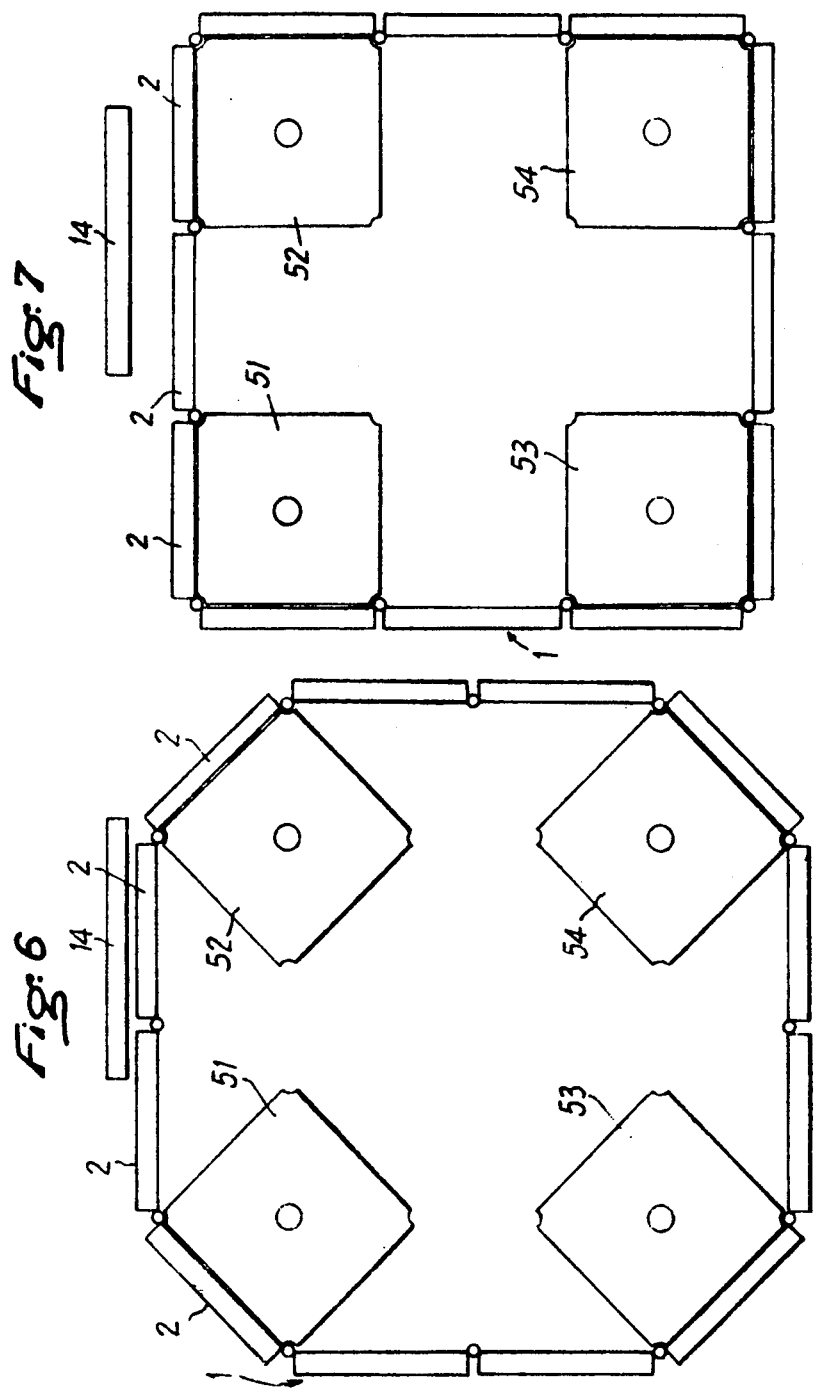

APPARATUS FOR SUCCESSIVELY POSITIONING A SERIES OF RADIOGRAPHIC FILM CASSETTES AT A FILM-EXPOSING STATION

The present invention relates to an apparatus for successively positioning radiographic film cassettes under a patient-examining plane and retracting the cassettes after exposure of the films, especially when the latter are of large dimensions.

Known apparatuses for successively positioning cassettes of large dimensions comprise a drum of hexagonal cross-section, and six radiographic film cassettes are positioned on the respective faces of the drum. The transfer of the cassettes is effected by successive rotation of the drum through 60° but the presence of the drum apices implies that the drum must be maintained at a relatively large distance from the patient-examining plane when the drum axis is fixed. Since the quality of the radiographic pictures decreases with the distance between the examining plane and the cassette, it is, in practice, necessary for exposing each film, to move the drum closer to the examining plane; then move the drum away to enable the indexing or positioning of the following cassette. This entails a certain mechanical complexity which increases the manufacturing cost of the apparatus and results in a lack of precision in the positioning of the cassettes with consequent lowering of the quality of the radiographs.

An object of the invention is to provide an apparatus of the character described, which will overcome the above-noted disadvantages of conventional apparatuses.

With this in mind, the apparatus in accordance with the invention comprises a chain, the links of which consist of boxes hinged one to the other and each adapted to receive a radiographic film cassette, this chain being trained on two drums having flat faces, the width of which is equal to the length of a chain link and which are mounted for rotation on two parallel shafts, the distance of the axes of which is equal to the length of a chain link, or to a multiple of said lengths, these shafts being mounted parallel to the patient-examining plane and at a distance from this plane as small as possible without preventing rotation of the drums.

Such an apparatus, which is of very simple construction, enables, by a simple angular indexing of the drums, of effecting the positioning of each cassette at a distance very close to the patient-examining plane and precisely parallel to the latter for exposing the radiographic film and then moving the cassette away from the examining plane and approaching the next cassette under the same conditions.

In accordance with one embodiment of the invention, the apparatus comprises two drums in the form of regular prism with a triangular base, the inter-axial distance of the two drums being equal to the length of one link of the chain, as well as a third drum located such that its axis determines an equilateral triangle with the axes of the first two drums.

The invention will become more apparent during the following disclosure and by referring to the drawings, which show non-limitative embodiments of the apparatus in accordance with the invention.

In the drawings:

FIG. 4 is a perspective view of an embodiment of the cassette boxes different from those shown in FIGS. 1 and 2;

FIG. 5 is a cross-section of still another embodiment of the boxes;

FIG. 6 is an end elevation of another embodiment of the apparatus comprising four drums of square cross-section and in a position for film exposure;

FIG. 7 is a view similar to that of FIG. 6 but showing the apparatus in an intermediate position during cassette transfer;

FIG. 8 is an elevation of one embodiment of a drum; and

FIG. 9 is a longitudinal section of another embodiment of a drum.

In the drawings, like reference characters indicate like elements throughout.

Figure 1:
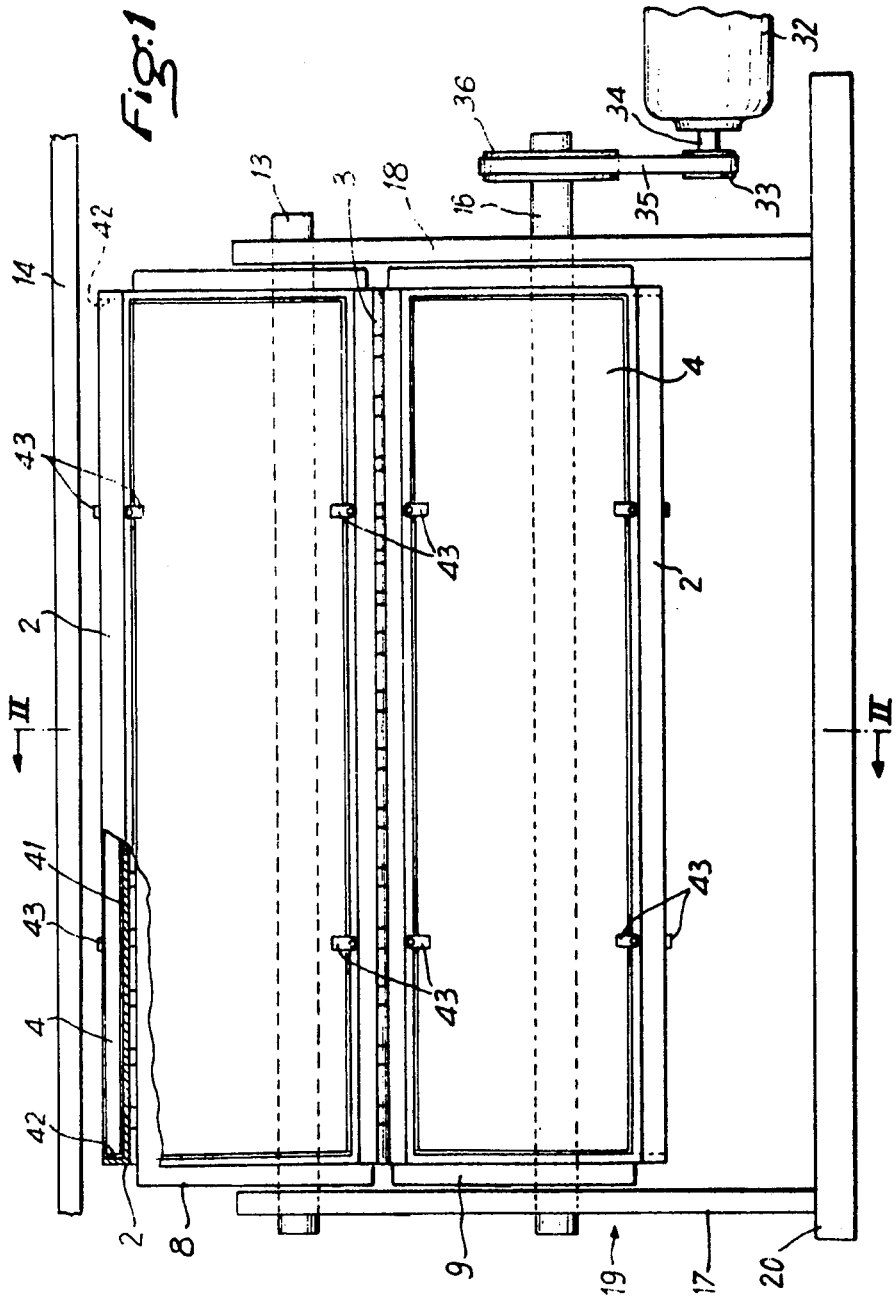
FIG. 1 is an elevation of a first embodiment of the invention in a position for exposing a radiographic film.
Figure 2:
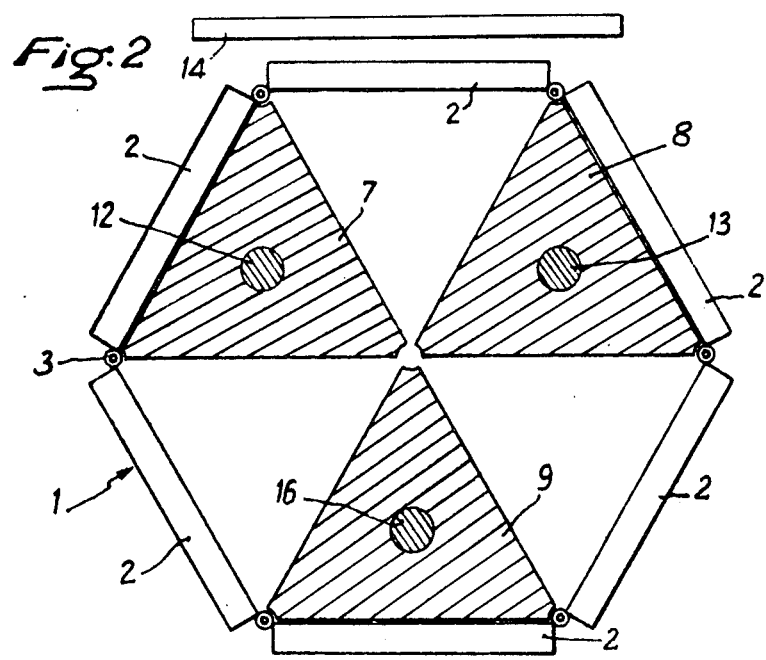
FIG. 2 is a cross-section along line 2—2 of FIG. 1.

The apparatus for successively positioning a series of radiographic film cassettes at a film-exposing station, and which is shown in FIGS. 1 and 2, comprises an endless chain 1, the chain links of which consist of thin boxes 2 hinged one to another by means of hinges 3 and each adapted to receive a radiographic film cassette 4. The chain 1 is trained on three drums 7, 8, and 9, each in the form of a regular prism with a triangular base defining flat faces, the width of which is equal to the length of a chain link, that is to the width of a box 2. The two drums 7 and 8 are each carried by two parallel shafts 12 and 13, respectively, located in a horizontal plane parallel to the patient-examining plane 14. The third drum 9 is carried by a shaft 16 parallel to shafts 12 and 13. The axes of the three shafts 12, 13, and 16 are located at the apices of an equilateral triangle. The distance between each pair of shaft axes is equal to the length of a chain link. The shafts 12, 13, and 16 are journalled in lateral walls 17 and 18 of a frame 19 provided with a base 20.

Figure 3:
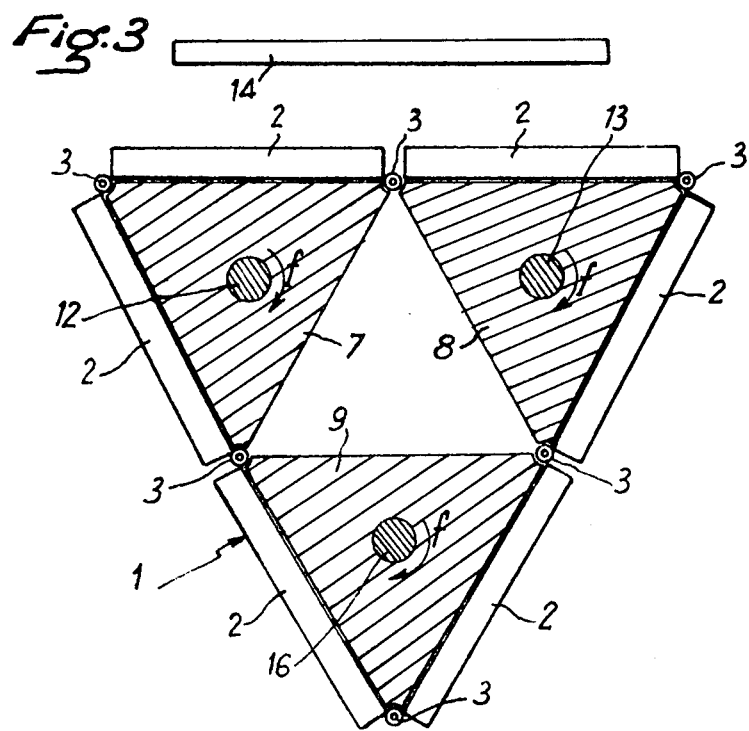
FIG. 3 is a cross-section similar to that of FIG. 2 but in an intermediate position during a change of cassette.

Chain 1 of cassette boxes 2 surrounds the assembly of the three drums 7, 8, and 9 and form a prism which takes various configurations during rotation of the drums and, more particularly, an hexagonal configuration shown in FIG. 2 and a triangular configuration shown in FIG. 3. Each drum, for example, drum 7, can be solid, hollow or made of lattice-work. As a modification, each of the drums can be provided with end flanges 21 and 22 for lateral guiding of the chain 1 as shown in FIG. 8. The drum could be made in a different manner, for example by being formed by two end flanges 25, 26 (FIG. 9) secured to the ends of shaft 12 and having shoulders 28, 29 for the lateral guiding of the chain 1.

The drums are driven in rotation by means of an electric motor 32 through a transmission comprising a pulley 33 secured to the motor shaft 34, a belt 35 trained on pulley 33 and on another pulley 36, which is fixed to one end of shaft 16. Chain 1 drives the two other drums 7 and 8 in synchronism with the rotation movement of drum 9. The electric supply circuit of electric motor 32 is controlled by a device, not shown, which ensures stepwise rotation movement of the three drums through 120°, for the taking of a radiographic picture.

In FIGS. 1 and 2, a very simple structure of each box 2 is shown as an example. Each box has a flat bottom 41 provided with an upstanding peripheral flange 42. The film cassette 4 is maintained in position within the box by means of four pivotable latches 43 mounted on the edges of the box and which can take either the cassette latching position shown in FIG. 1, or a cassette-releasing position by pivoting the latches towards the exterior of the box.

The apparatus operates as follows:

The apparatus being, for example, in the picture-taking position shown in FIGS. 1 and 2, the cassette in position within the topmost box 2 is located just underneath the station-examining plane 14, parallel to said plane and very close to the same. To bring the following cassette to the film-exposing station, the electric motor 32 is started to rotate the drums through 120°. The drums can rotate in either direction. When the drums have turned about their respective axis through an angle of 60°, they occupy the position shown in FIG. 3, wherein it is seen that the box 2, which was at the film-exposing station, has moved parallel to itself towards the right of drawing while progressively moving away from the patient-examining plane 14. Starting from this position, further rotation movement of the drums in the direction of arrows f, causes the following box 2, which had started from an oblique position and had come to a position parallel to the patient-examining plane 14, to move upwardly, while remaining parallel to itself, until it finally occupies a position at the film-exposing station which was previously occupied by the preceding box.

It is, therefore, apparent that the apparatus, while of very simple construction, enables the positioning of the successive cassettes very close to the patient-examining plane due to the successive approaching and withdrawing movements of the boxes with respect to the examining plane 14, these movements being automatic by the simple angular indexing movement of the drums without the necessity of providing complex specific mechanisms. The cassettes are always not only very close to the examining plane but precisely parallel to the latter; even if the indexing movement of the drums is not stopped precisely at the same position, the cassettes will nevertheless occupy a position precisely parallel to the examining plane, because they form one side of an articulated parallelogram beginning with the moment corresponding to the middle of the transfer phase of the cassettes.

Although the apparatus just described comprises three drums, the number of drums is not limitative. For example, the lower drum 9 can be absent, in which case at least one of the other drums 7 and 8 would be driven in rotation. The drums could also have a cross-sectional shape other than an equilateral triangle, for example a square cross-sectional shape, as shown in the embodiment of FIGS. 6 and 7. In this embodiment, the two upper drums 51 and 52 and the two lower drums 53 and 54 have their rotation axes distant from each other a distance equal to a multiple of the length of a chain link; in this particular case, a distance equal to the length of two main links.

In FIG. 6, the chain is in a position for picture taking, whereas in FIG. 7 the chain has a configuration taken at the middle of a cassette transfer phase.

The box structure and the means for holding the cassette within the boxes can be different from those shown in FIGS. 1 and 2. FIG. 4 shows a first modification in which each box 2 is composed of a bottom 61 with an edge portion comprising a part 62 upstanding perpendicular to the bottom and followed by a part 63 folded parallel to said bottom to thus form a peripheral channel on three sides of the box to receive the marginal portions of a cassette.

A latch, of any appropriate type, such as for example, the L-shaped pivoted finger 65, enables, when in raised position shown in dotted lines, the insertion of a cassette within the box 2 by sliding the same in the guideways parallel to the bottom 61. The movement of the latch 65 to the full line position latches the cassette in position within the box.

FIG. 5 shows still another modification of the box 2 wherein it consists of a bottom 71 with an upstanding edge 72 on the four sides of the bottom whereas on two opposite sides, flanges 73 and 74, respectively, extend parallel to the bottom to form channels, in one of which is located a compression spring 75. Thus, a cassette can be inserted by slightly compressing the spring 75 until the cassette can be hooked underneath flange 73, the inserting movement of the cassette being shown in dot-and-dash lines and in full lines in FIG. 5. By inverse movement, it is obviously easy to remove the cassette after picture taking.

It is obvious that the present invention is not limited to the embodiments shown and described and modifications can be made without departing from the scope of the annexed claims.

What I claim is:

1. An apparatus for successively positioning a series of radiographic film cassettes at a film-exposing station, comprising a chain, the links of which consist of boxes hinged one to the other and each carrying a radiographic film cassette, said chain being trained on two polygonal drums having flat faces, the width of each face equal to the length of a chain link, mounted for rotation on two parallel shafts, the distance between the rotation axes of said drums being equal to the length of a chain link multiplied by a whole number, said shafts being mounted parallel to a patient-examining plane and at a distance from this plane as small as possible without preventing rotation of the drums.

2. An apparatus as claimed in claim 1, wherein said chain is an endless chain.

3. An apparatus as claimed in claim 2, further including an additional drum similar to the first two named drums and on which said chain is also trained.

4. An apparatus as claimed in claim 2, wherein said two drums each has the shape of a regular prism with a triangular base, the distance between the rotation axes of the drums being equal to the length of a chain link.

5. An apparatus as claimed in claim 4, further including a third drum identical to the first two named drums and located at such a position that its rotation axis determines an equilateral triangle with the pivotal axes of the two first-named drums.

6. An apparatus as claimed in claim 1, further including means to rotate drums step by step.

7. An apparatus as claimed in claim 1, wherein each drum consists of a shaft with two end flanges of polygonal shape.

8. An apparatus as claimed in claim 1, wherein both ends of at least one of said drums has a flange for the lateral guiding of the chain of boxes.

9. An apparatus as claimed in claim 1, wherein each box has means for removably retaining a cassette therein.

* * * * *